May 27, 1969 E. M. HENDERSON ET AL 3,446,140

SAFEGUARD CHARACTER INDEXING MECHANISM

Filed Jan. 15, 1968 Sheet 1 of 6

INVENTORS.
EDDIE M. HENDERSON.
CHARLES G. STEPHEN.

Edwin W. Uren

AGENT.

United States Patent Office 3,446,140

Patented May 27, 1969

3,446,140

SAFEGUARD CHARACTER INDEXING MECHANISM

Eddie M. Henderson, Lenzie, and Charles G. Stephen, Cumbernauld, Scotland, assignors to Burroughs Corporation, Detroit, Mich., a corporation of Michigan Filed Jan. 15, 1968, Ser. No. 697,982
Int. Cl. B41j
U.S. Cl. 101—93 18 Claims

ABSTRACT OF THE DISCLOSURE

A predetermined number of type carriers in an accounting machine are each provided with a safeguard type character, such as a $ sign, located above the 0 type. Means are provided for selectivity lowering one of these type carriers from its 0 printing position to its safeguard symbol printing position during a printing operation so that a safeguard symbol is printed immediately to the left of the highest order digit of a printed amount. Keyboard control means are provided for activating and de-activating the safeguard characters depending upon whether monetary amounts are to be printed on checks or the like or on non-negotiable records.

*Background of the invention*

Many varieties of accounting and bookkeeping machines are known which provide "visible" printing of numerical amounts on ledgers, statements, and other record media, the visible nature of such printing being characterized by the readability of printed amounts even though the media is not spaced vertically subsequent to printing. In many of these machines, printing is accomplished by means of a plurality of type carriers and hammers, the type carriers being raised to bring selectively indexed type into printing position where they are impacted by hammers against a ribbon and a record medium disposesd on a paper-bearing carriage. The selectively indexed type, including the zero type, are moved upwardly to the printing position before hammer impacting, and all of the type characters are moved downwardly below the printing position upon completion of a printing cycle. The 0 characters in these machines are generally located at the uppermost extremity of the type carriers, with the 1 through 9 type positioned sequentially therebeneath.

Many of these accounting and bookkeeping machines are adapted for printing on checks and other negotiable instruments, as well as for printing on conventional bookkeeping rcords.

Whenever an accounting machine is so adapted, measures of a sort are generally required in order to protect the printed checks from subsequent fraudulent upgrading, such fraudulent upgrading being oherwise achievable by the simple addition of a digit to the left of the highest order digit of the printed amount. To prevent this fraudulent practice, the manufacturers of many of these machines have variously provided aggregations of improvised parts according to the peculiar structure of the printing means employed, such parts being designed to print a safeguard symbol to the left of the highest order digit. These parts have usually been disseminated through various areas and sections of the machine, and have been known to require frequent modification and redesign as improvements are made in the machine indexing and printing means. Safeguard character indexing, in other words, has frequently assumed the status of an expensive afterthought that commonly requires continued attention, re-structuring and redesign as the marketing community imposes additional demands upon machine capacity, flexibility and performability.

*Summary of the invention*

It is accordingly an object of the present invention to provide a safeguard character indexing mechanism which is readily adaptable to all accounting machines which utilize vertically disposed type carriers for the "visible" printing of amounts, and which also employ a cam-bearing drive for the control of its various functions.

It is also an object of the present invention to provide a safeguard character indexing mechanism which assumes its own separate status and identity, and which is of such a compact nature as to render it readily installable in a variety of accounting machines with minimum effort and expense.

It is a further object of the present invention to provide a safeguard character indexing mechanism that is completely reliable in its operation, inexpensive to manufacture and to maintain, and highly flexible in its application.

An important aspect of the invention is the inclusion of a suitable safeguard type character, such as a dollar character, immediately above the zero type in a predetermined number of type carriers comprising a range of orders within which protection is desired, such type carriers within such range each having a radial notch effective for releasably activating the hammer latch of corresponding order when the type carrier is activated either upwardly or downwardly from its 0 printing position, each type carrier within such range having also a first and a second stud element extending outwardly from the side surfaces thereof.

Another aspect of the invention is the use of a predetermined number of longitudinally and rockably movable slides disposed within a yoke member, such slides being activated by the main drive shaft of the accounting machine to engage the second stud elements of their leftwardly adjoining type carriers when permitted by the location of the first stud elements of their rightwardly adjoining carriers, said slides being also activatable downwardly by the main drive shaft to thereby lower the type carriers with the second stud elements of which they are engaged from their 0 printing position to their safeguard character printing position.

Still another aspect of the invention is the use of a yieldable connection in the conventional type-positioning gear train, such connection permitting the safeguard type carriers to be lowered from their 0 printing positions to their safeguard character printing positions at a time when their respective actuators are limited in their indexing travel by the 0 stop shoulders of their respective stop sectors.

A further aspect of the invention is means for disabling the safeguard character indexing mechanism when amounts are to be printed on bookkeeping forms or other non-negotiable records.

*Brief description of the drawings*

These and other objects, aspects and advantages of the invention will be more clearly understood from the following description when read in conjunction with the accompanying drawings, in which.

*Detailed description of the invention*

Figure 1:
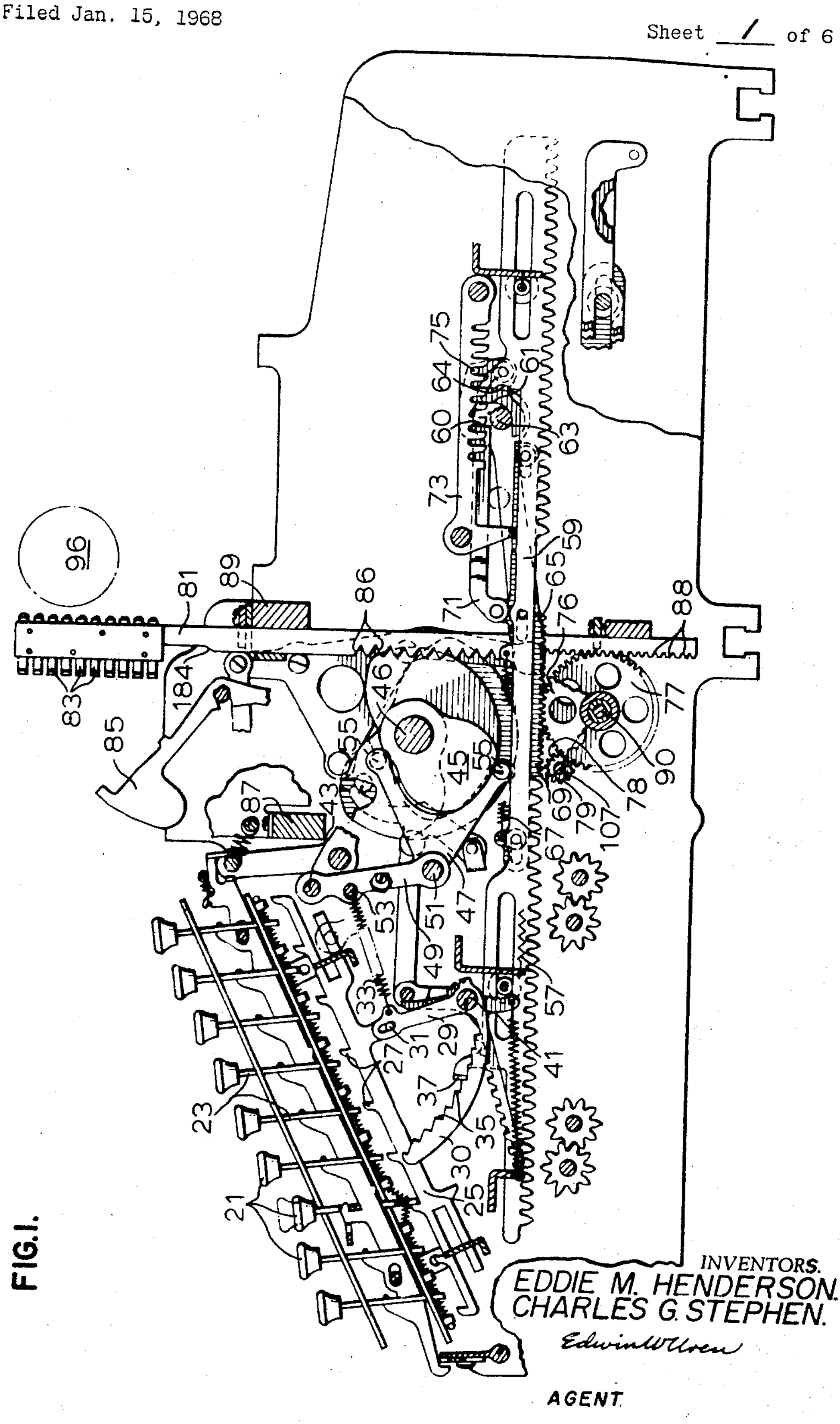
FIGURE 1 is a right side sectional elevation of a typical accounting machine in which the preferred embodiment of the invention may be incorporated.

FIGURE 1 serves to illustrate the keyboard indexing mechanism of a typical accounting machine as disclosed in U.S. Patent No. 2,629,549, such patent having been assigned to the assignee of the present invention. In this typical accounting machine, the type carriers 81 are selectively indexed upwardly into printing position according to the value of the keys 21 that are depressed prior to the initiation of a machine cycle.

Early in a printing machine cycle, a bail rod 43 is activated rearwardly (to the right as viewed in FIGURE 1) to thereby permit a plurality of stop slides 25 to be moved rearwardly by their respective springs 33 until limited by contact of a stop 27 against a depressed keystem 23. Rearward activation of the bail rod 43 is accomplished by means of a cam 45, attached to the drive shaft 46, acting on a pair of rollers 55 to effectively rotate a three-armed lever 47 in a clockwise direction about a pivot axis provided by a shaft 51. At least two arms 49 are fixed to the shaft 51, the rightmost one of which is connected also to the upright arm of the three-armed lever 47. The bail rod 43 and a rod 53 are supportively carried by the arms 49, the latter rod providing anchorage for the rearmost ends of the springs 33. Rearward activation of the stop slides 25 is accomplished by a corresponding clockwise rotation of the respective stop sectors 30 about a shaft 41, such rotation also being motivated by the springs 33, the foremost ends of which are connected to upper arms 29 of the stop sectors in such manner as to transmit motive power to the stop slides 25 through stud and slot connections indicated at 31. The clockwise rotation of each of the stop sectors 30 is effective to position a selected one of its stop shoulders 35 into horizontal alignment with a lateral lug 37 formed in the foremost portion of its respective actuator 59.

At a later point in a printing machine cycle, an actuator shaft 63 is activated forwardly to thereby release a forwardly facing shoulder 64 formed in the rearmost portion of each actuator 59. The various actuators 59 are thereupon moved forwardly by their respective springs 57 until limited by contact of their respective lateral lugs 37 against the indexed stop shoulders 35 of the differentially rocked stop sectors 30. The rearmost stop shoulder 35 of each stop sector represents the zero indexing limit for its respective actuator 59, and the foremost stop shoulder represents the nine indexing limit. A slide 69 comprising teeth 65 disposed in its lower edge is carried by each actuator 59 and is biased in a rearward position thereof by a spring 67. Each slide 69 also carries a pivotal coupling pawl 71 disposed on its rearmost portion, such pawl having a slot with a forwardly facing open horizontal portion and an upright vertical portion in which latter portion the actuator shaft 63 nestles when the machine is at rest. The shaft 63, coupling pawls 71, slides 69, and actuators 59 are moved forwardly in unison until the lateral lug 37 of the individual actuators is limited by a selectively indexed stop shoulder 35 of its respective stop sector 30. When such limit occurs, the actuator shaft 63 impinges against the rearwardly facing shoulder 60 of the slot 61 formed in the individual coupling pawls 71 to thereby impart an additional unit of forward movement to the corresponding slides 69 on their respective actuators 59, against the bias of the springs 67 (to thereby achieve visible printing), and to thereafter force the individual coupling pawls 71 in a counter-clockwise direction relative to their respective slides 69 to as to position their individual studs 75 into engagement with one of the slots in the individual lock plates 73. The actuator shaft 63 is thereafter permitted to complete its forward travel independently of the coupling pawls 71, the slides 69 and the actuators 59.

During the time the individual slides 69 are moved forwardly a differential distance to be limited by the selectively indexed stop shoulders 35, a differential counterclockwise rotation is imparted to the corresponding large gears 76 by the teeth 65. Corresponding pinions 78, being meshed with the large gears 76, are rotated a corresponding distance in a clockwise direction to thereby rotate their respective shafts 107 and companion pinions 79 also in a clockwise direction. The clockwise rotation of the pinions 79 is effective to rotate the corresponding large gears 77 in a counterclockwise direction, and to thereby raise the respective type carriers 81 a differential distance to their selectively indexed printing positions.

The type carriers 81 of such typical accounting machines comprise a plurality of type characters 83 which range in value from zero to nine, and which are arranged in stacked fashion at the uppermost extremity of each carrier. The zero type character is located in the uppermost position in the stack, and the nine type is located in the bottom position therein. Each type character comprises a numerical font of predetermined value disposed on its rearmost edge (rightmost edge as viewed in FIGURE 1), and a flat striking surface disposed on its foremost edge. The striking edge of a type character is impacted by a spring-driven hammer 85 to thereby imprint a number of corresponding value on paper which is retentively positioned on a platform 96. The type carriers 81 also normally comprise: an inclined surface 184, the function of which is hereinafter described; a plurality of teeth 86, one notch of which is engaged by an aligning bail during each printing operation; and a plurality of teeth 88 disposed in the lowermost portion thereof, the latter teeth, as previously suggested, being cooperably engaged with a large gear 77 to effectively raise the type carrier to its selectively indexed position as the gear 77 is rotated in a counterclockwise direction.

When, during a printing operation, the type carriers 81 are positioned upwardly to their selectively indexed printing positions, hammers 85 of corresponding order are activated in a clockwise direction, as described in the aforementioned patent, to effectuate the printing function. Prerequisite to the forcible clockwise rocking of each of the hammers 85 is the release of its associated hammer latch (similar to the latch 111 shown in FIGURE 2 but excluding the offset extension 123). The hammer latch associated with each type carrier that is indexed upwardly above its 0 printing position is rocked in a counterclockwise direction by means of the inclined surface 184 of the upward rising type carrier. Such rocking of a hammer latch effectively removes its shoulder stop 117 (FIGURE 2) from its blocking position relative to the lateral lug 119 of the corresponding hammer 85, and thereby releases the hammer preparatory to its impacting motion. Hammers associated with type carriers to the right of the highest order of the indexed type carriers are also released by means of the leftwardly and forwardly extending projection 121 (FIGURE 2) formed in each hammer latch. Such release, being necessary in order to print 0's in the lower orders, is accomplished through the contact of each counterclockwise rocking hammer latch, beginning with the latch associated with the highest order upward rising type carrier, against the projection 121 of its rightwardly adjoining hammer latch.

Figure 2:
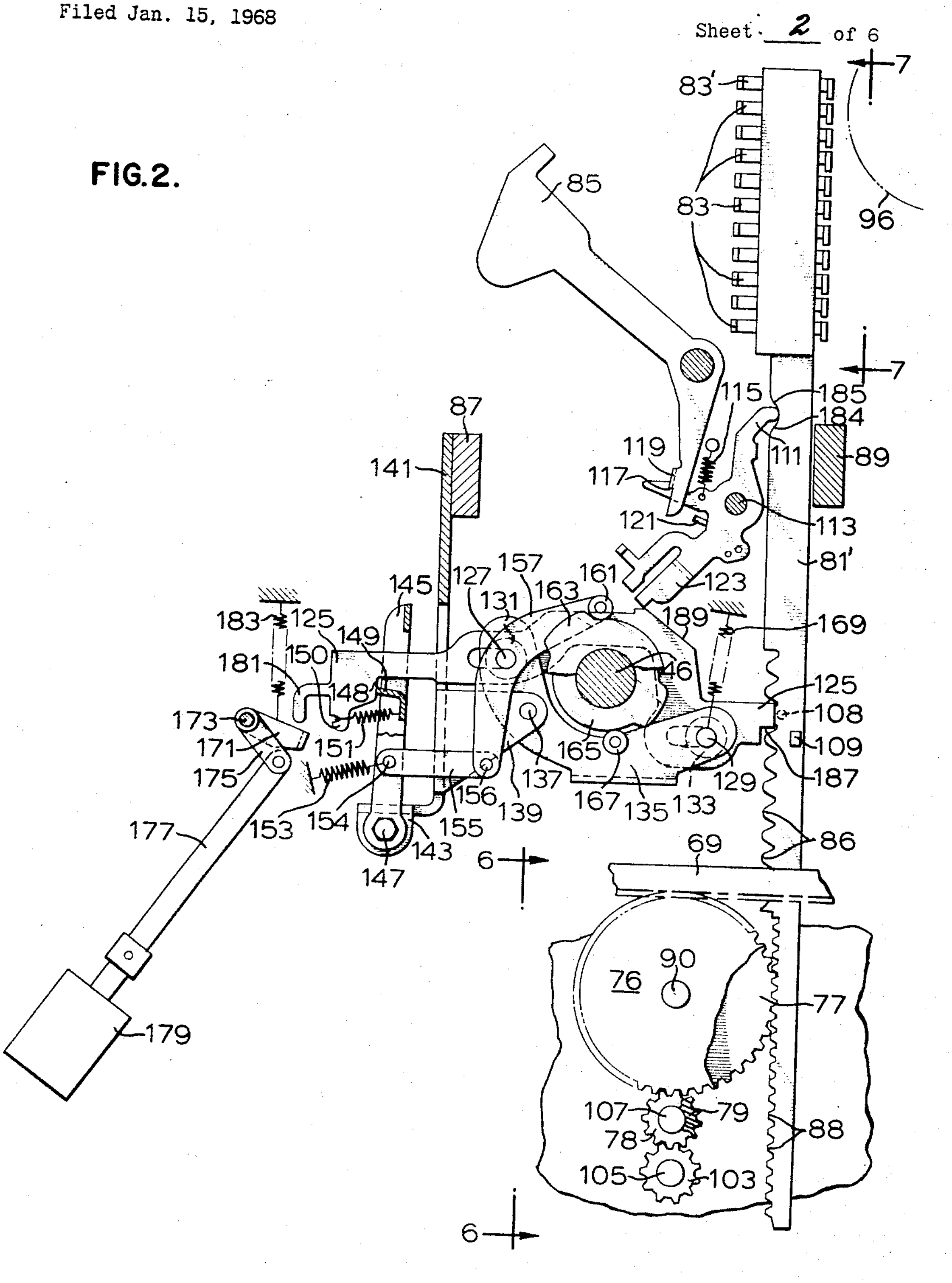
FIGURE 2 is a right side elevation of the invention shown in relationship with the main drive shaft and type carriers of FIGURE 1, and showing also the gear and pinion arrangement for selectively indexing the type carriers into printing position.
Figure 3:
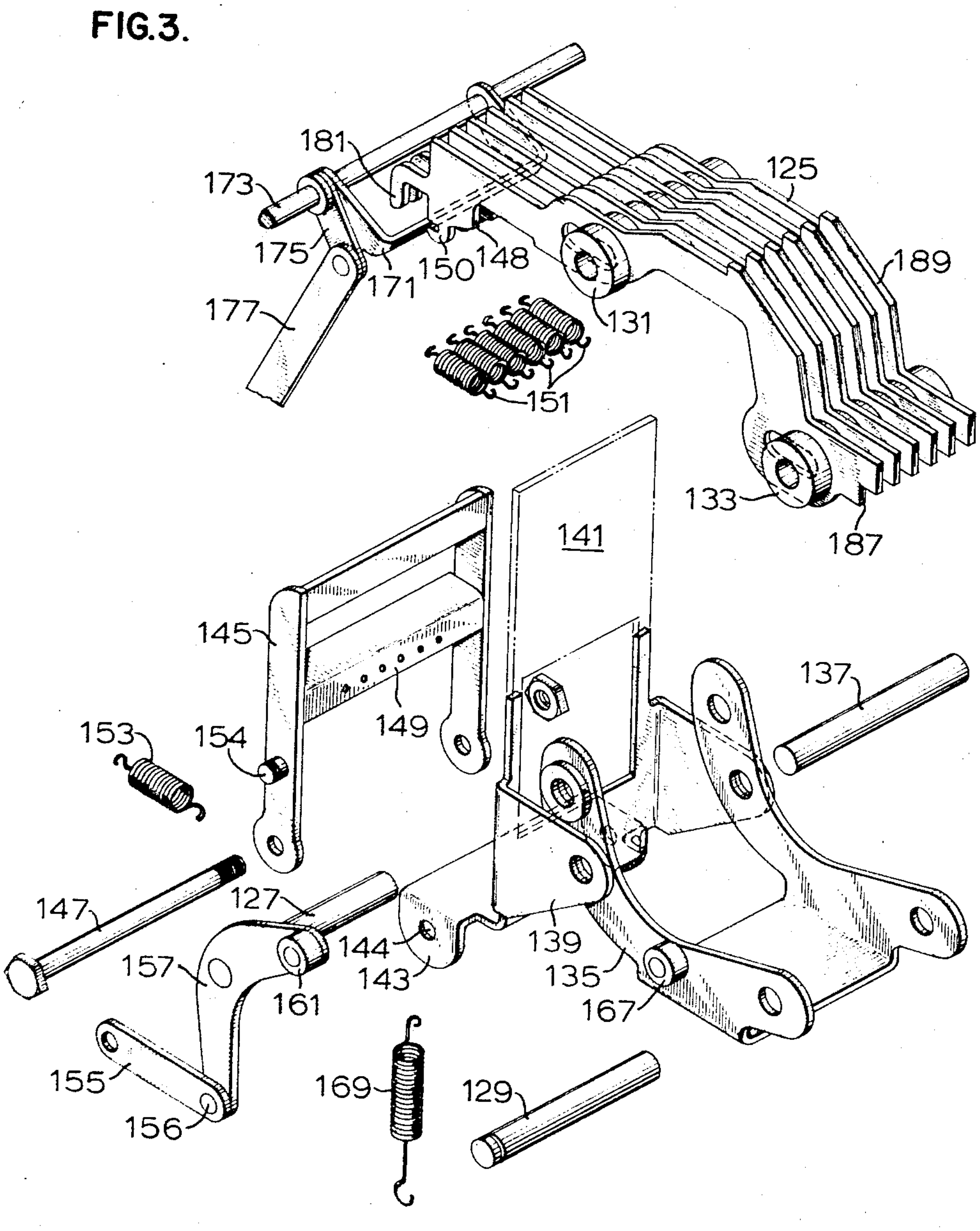
FIGURE 3 is an exploded view taken from the right rear corner showing the details of various of the safeguard character indexing parts.
Figure 6:
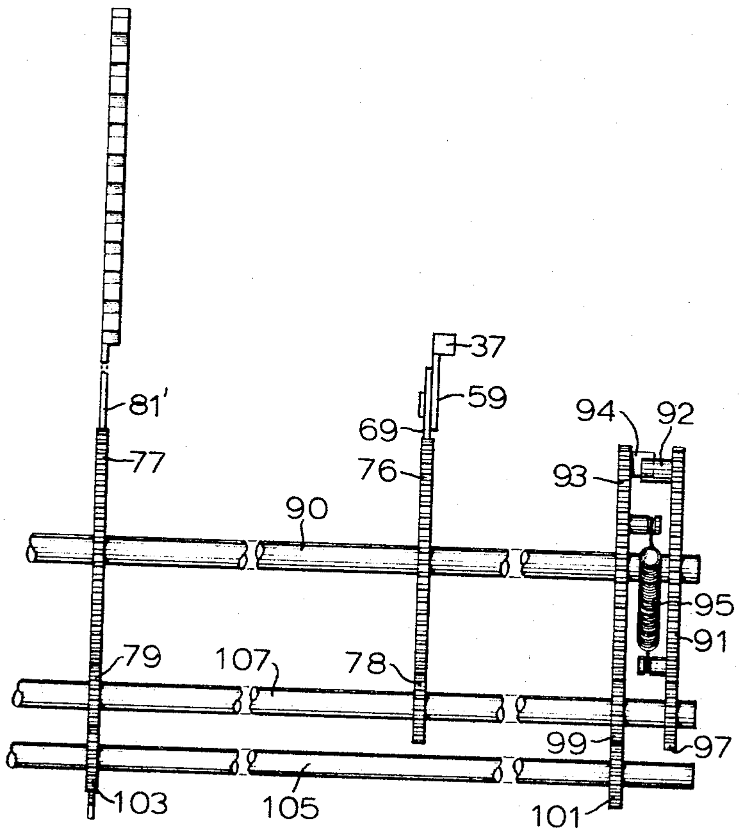
FIGURE 6 is a partial view taken on line 6—6 of FIGURE 2, showing the yieldable type-positioning gear train as it relates to a given order type carrier within the predetermined range.

With reference to FIGURES 2, 3 and 6, the preferred embodiment of the invention comprises improved type carriers 81', a plurality of safeguard slides 125, means for activating the slides both rearwardly and downwardly, and a yieldable type-positioning gear train associated with each order type carrier within the range of orders within which safeguard character printing is desired.

*Safeguard type carriers*

Figure 4:
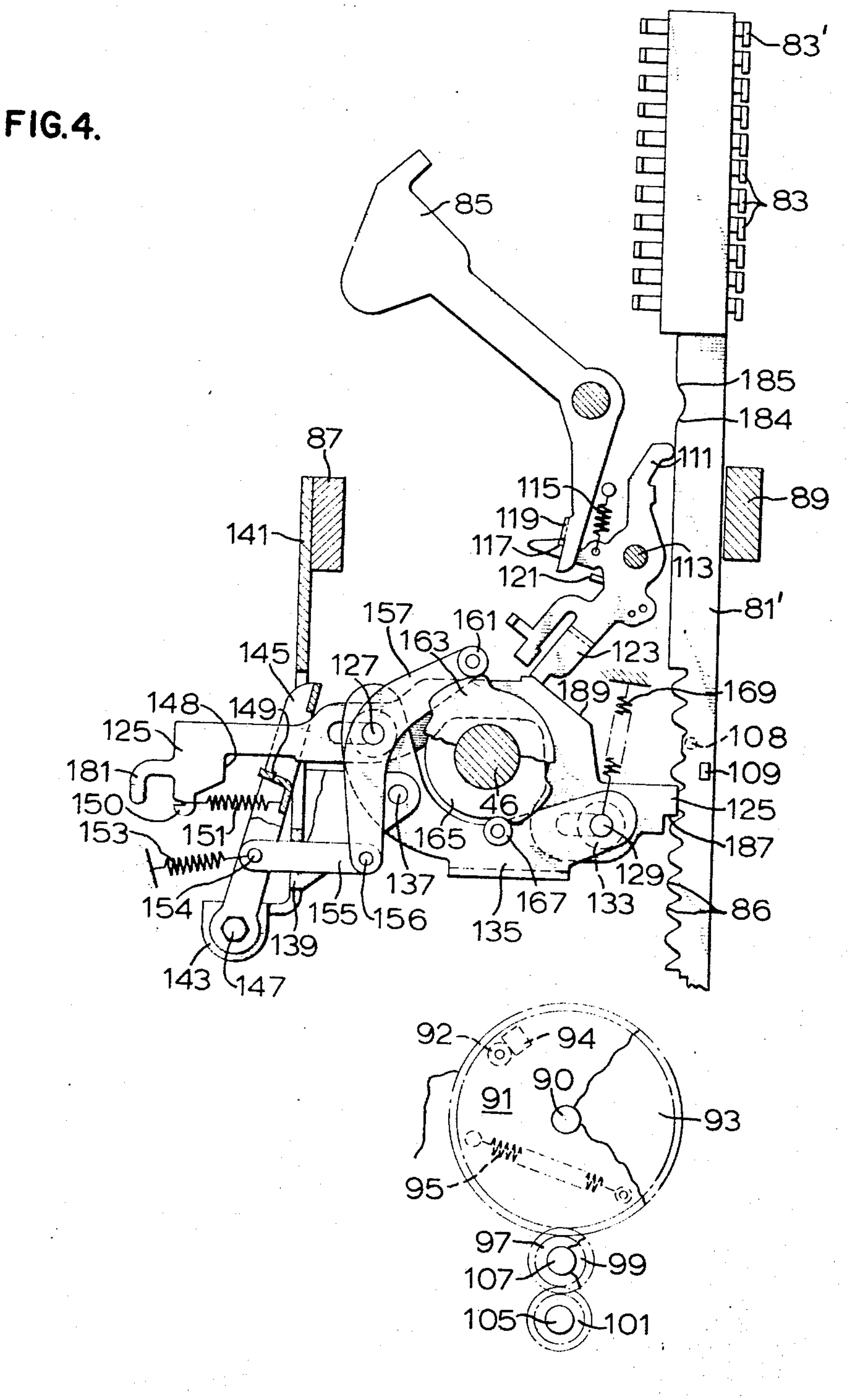
FIGURE 4 is a right side elevation showing the blocking effect of a hammer latch when its corresponding type carrier is located in an indexed position, and showing also the yieldable connection in the type-positioning gear train.
Figure 5:
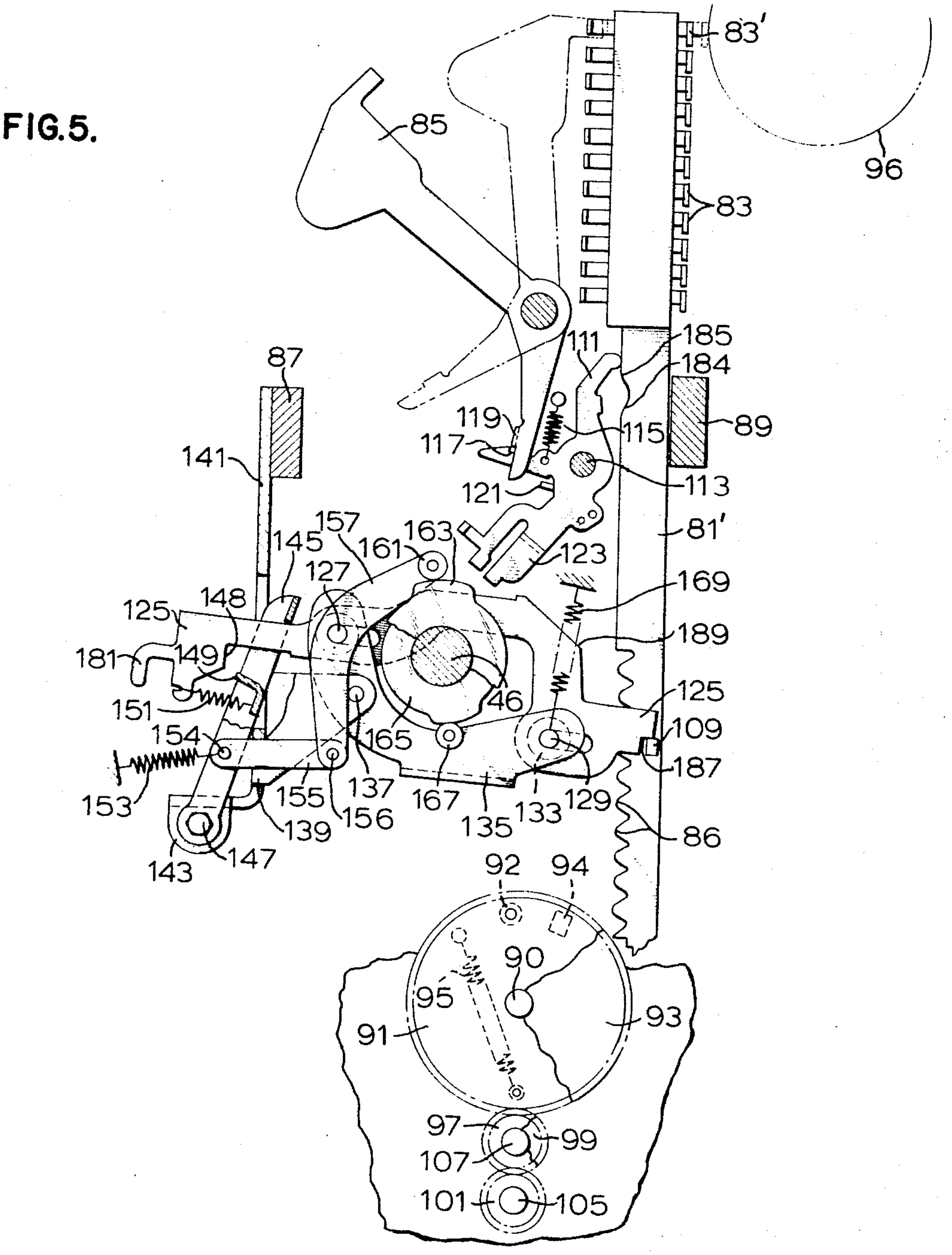
FIGURE 5 is a right side elevation showing the embodiment in an activated state with a type carrier located in its safeguard character printing position.
Figure 7:
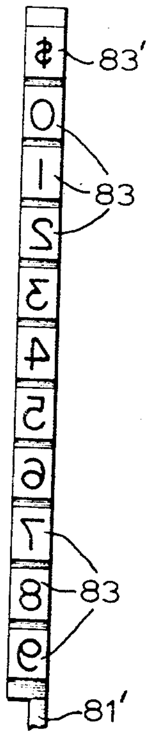
FIGURE 7 is a partial view taken on line 7—7 of FIGURE 2 showing a type carrier comprising a safeguard type character.
Figure 8:
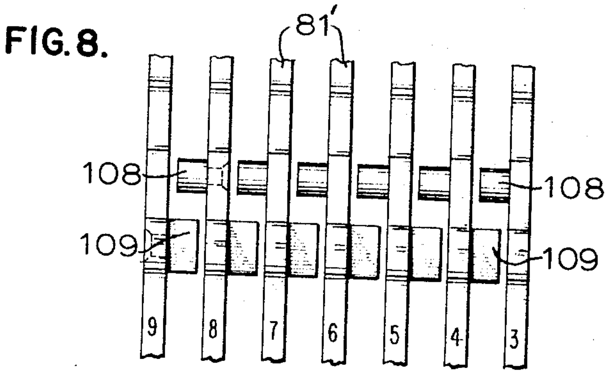
FIGURE 8 is a partial front view of a plurality of safeguard type carriers showing the first and second stud elements extending outwardly from the side surfaces thereof.

The type carriers 81', which are deposited in a predetermined number of orders of the printing means, as in the orders 4 through 9 shown in FIGURE 8, each comprises a safeguard type character positioned above the zero type (as shown in FIGURE 7), an upper inclined surface 185 (as shown in FIGURES 2, 4 and 5) disposed above the inclined surface 184, a rightwardly extending activating stud 109 (as best shown in FIGURE 8), and, except for the highest order type carrier comprising a safeguard character, a leftwardly extending cylindrical blocking stud 108. A blocking stud 108 is also disposed on the type carrier 81 which rightwardly adjoins the lowest order type carrier 81' (as shown in the third order in FIGURE 8). The functions of the upper inclined surfaces 185, and of the studs 108 and 109 will be explained in a subsequent section.

*Indexing means*

With reference to FIGURES 2 and 3, a plurality of safeguard slides 125, the quantity thereof corresponding in number to the range of orders in which safeguard character printing is desired, are slidably supported by a pair of shafts 127 and 129, and are spaced apart in a cradled position within a yoke member 135 by means of space collars 131 and 133. The yoke member 135 comprises a roller 167, and carries the shafts 127 and 129 which are loosely fitted into a pair of apertures disposed in the foremost and rearmost extensions thereof, respectively. The yoke member 135 is pivotally connected to a support bracket 139 by means of a shaft 137 about which the yoke member 135, the shafts 127 and 129, and the slides 125 may be pivoted.

The support bracket 139 comprises an offset pivot lip 143 having a pair of apertures 144, and is secured to the transverse support member 87 (shown in FIGURE 1) by means of a depending member 141. A pivot member 145 comprising a pair of upright arms, an upper connecting member, and a limit plate 149, is pivotally connected to the support bracket 139 by means of a shaft 147 which is loosely fitted into the pair of apertures 144 in the offset pivot lip 143. The pivot member 145 is biased in its counterclockwise rocked position (as shown in FIGURE 2) by a spring 153, one end of which is attached to a frame member of the machine and the opposite end to an anchor stud 154 disposed on the outer surface of the rightmost upright arm of the pivot member 145. When the pivot member 145 is positioned in its counterclockwise rocked position, the limit plate 149 effectively holds the safeguard slides 125 in their forward inactivated positions, through its contact with their rearwardly facing shoulders 148. A plurality of springs 151 attached to corresponding aperatures in the limit plate 149 and to anchor projections 150 formed in the forward portion of the slides 125, serve to bias the slides 125 into contacting relationship as between their shoulders 148 and the limit plate 149.

A bellcrank 157 comprising a roller 161 rotatably attached to its uppermost extremity, is fixed to the rightmost extremity of the shaft 127, and is pivotally connected to a link 155 by means of a stud 156 disposed on the bellcranks' lowermost extremity. The link 155 is also pivotally attached to the anchor stud 154 of the pivot member 145. As previously mentioned, the shaft 127, to which the ballcrank 157 is fixed, is loosely fitted and rockable within the pair of apertures in the foremost extensions of the yoke member 135, and is loosely fitted and rockable also in the space collars 131. The bellcrank 157 may accordingly be rocked in either a counterclockwise or clockwise direction about its pivot axis 127, to effectively rotate the pivot member 145 in a clockwise or counterclockwise direction on its pivot axis 147, respectively, by means of the link 155 and the studs 156 and 154. The slides 125 also comprise hooked tails 181 formed in their foremost extremities, and angled faces 189 and notches 187 formed in their rearmost portions, as hereinafter functionally explained.

The arrangement of the slides 125, the yoke member 135, and the support bracket 139 is such that the radially formed portions of the slides 125 are disposed above the drive shaft 46, and the yoke member 135 is disposed on the underside thereof. A cam 163 fixed to the drive shaft 46 is cooperably aligned with the roller 161 attached to the bellcrank 157, and a second cam 165, also fixed to the shaft 46, is cooperably aligned with the roller 167 attached to the yoke member 135. The hooked tails 181 formed in the foremost extremities of the slides 125 cooperate with control means which is described in a subsequent section, and the notches 187 of the slides cooperate with the activating studs 109 in a manner hereinafter described under the title "Safeguard Character Printing." The hammer latches 111 (shown in FIGURES 2, 4 and 5), one of which cooperates with each type carrier 81', each comprise an offset extension 123 which cooperates blockingly with the angled face 189 of its corresponding safeguard slide 125, such blocking action being effective to prevent the erroneous printing of the safeguard character in lieu of a 0 in orders lower than the highest indexed order, as will also be explained in greater detail hereinafter. A spring 169, connected to the shaft 129 and to a machine frame member effectively biases the shaft 129, the yoke member 135, and the safeguard slides 125 in their normal counterclockwise rocked positions relative to the shaft 137.

As previously mentioned, the spring 153 normally biases the pivot member 145 in its counterclockwise rocked position on the shaft 147. When so positioned, the safeguard slides 125 are held forwardly in their inactivated positions by the limit plate 149. Early in a printing operation, after the indexed type carriers 81 and 81' have been raised to their selectively indexed printing positions, the cam 163 exerts an upward thrust against the roller 161, to thereby rotate the bellcrank 157 and the shaft 127 in a counterclockwise direction. The counterclockwise rocking of the bellcrank 157 effectively rotates the pivot member 145 in a clockwise direction against the bias of the spring 153 (as shown in FIGURES 4 and 5), by means of the link 155. The clockwise rocking of the pivot member 145 and its limit plate 149 causes the safeguard slides 125 to be activated rearwardly through the bias of the expanding springs 151, the extent of such rearward movement of each slide being dependent upon whether it is blocked by its corresponding blocking stud 108 or by the offset extension 123 of its corresponding hammer latch 111, or whether it is permitted its full rearward movement so that its notch 187 engages its corresponding activating stud 109. The conditions under which the full rearward movement of a slide is prevented and permitted are explained in the following paragraphs.

At a later point in the printing operation, the cam 165 exerts a downward thrust against the roller 167 to thereby rotate the yoke member 135 in a clockwise direction on the shaft 137, and to rotate the slides 125 in a clockwise direction about an axis substantially defined by the drive shaft 46. This clockwise rotation of the slides 125 effectively lowers a type carrier 81' the stud 109 of which is engaged with the notch 187 of its corresponding slide 125. The conditions under which a selected one of the type carriers 81' is so lowered from its zero printing position to its safeguard character printing position are described in the following paragraphs.

*Safeguard character printing*

As previously indicated, the cam 163 attached to the drive shaft 46 contacts the roller 161 early in a printing operation to effectively rotate the pivot member 145 and the limit plate 149 in a clockwise direction. As a consequence of this clockwise rocking of the pivot member 145, the slides 125 are actuated rearwardly by the springs 151 to either be limited by their corresponding studs 108 or their corresponding extensions 123, or to engage their respective activating studs 109.

When the type carriers 81' in all orders in which safeguard character printing is provided are located in their zero printing positions, the blocking stud 108 corresponding to each slide lies in the rearward moving path of its respective slide to thereby prevent it from engaging the activating stud 109 of the type carrier 81' of corresponding order. The subsequent clockwise rocking of the yoke member 135 and the slides 125, as motivated by the cam 165, is accordingly rendered ineffective to lower any of the type carriers 81' from their zero printing positions to their safeguard character printing positions.

When the digit of greatest significance of a number to be printed corresponds to one of the orders comprising the range of orders within which safeguard character printing is provided (FIGURE 8), the type carrier 81' corresponding to such most significant digit is activated upwardly to a printing position which corresponds to the value of such most significant digit. This upward indexing of the corresponding type carrier 81' and its associated blocking stud 108 effectively raises the blocking stud above its blocking position relative to the leftwardly adjoining slide 125, the upward movement of the type carrier being effectuated prior to the clockwise rocking of the pivot member 145 and the resulting rearward activation of the slides 125. The slide 125 leftwardly adjoining the upwardly indexed type carrier 81' is accordingly permitted to move fully rearward so that its notch 187 is engaged with the activating stud 109 of the leftwardly adjoining or next higher order type carrier 81'. Following this engagement of the notch 187 with the stud 109, the clockwise rocking of the yoke member 135 and the slides 125, as motivated by the cam 165, is effective to lower said next higher order type carrier 81' from its zero printing position to its safeguard character printing position (as shown in FIGURE 5). This downward movement of the next higher order type carrier is effective to rock its corresponding hammer latch 111 in a counterclockwise direction on the shaft 113 by means of its upper inclined surface 185. The hammer 85 corresponding to the next higher order type carrier is accordingly released to effectuate the printing of the safeguard character in the printing column immediately to the left of the most significant digit of the printed amount.

When digits of a value greater than zero are to be printed in one or more of the orders comprising the range of orders within which safeguard character printing is provided, the safeguard character will be prevented from printing in each of such orders inasmuch as the type carrier 81' and activating stud 109 corresponding thereto are indexed upwardly to their selectively indexed positions prior to the time the associated slides 125 are activated rearwardly by their respective springs 151 (FIGURES 2, 4 and 5). The studs 109 of such type carriers 81' are accordingly located above the position at which they may be contacted by the notches 187 of the rearwardly moving slides 125. The subsequent clockwise rocking of the yoke member 135 and the slides 125 is accordingly rendered ineffective to lower the type carriers 81' corresponding to such orders from their zero printing positions to their safeguard character printing positions.

Were a zero to be printed in one or more of the orders comprising the range of orders within which safeguard character printing is provided, the upward activation of the type carriers 81' and associated blocking studs 108 rightwardly adjoining the type carriers corresponding to such orders would permit the slides 125 corresponding to such orders to engage their associated studs 109 and to lower such corresponding type carriers from their 0 printing positions to their safeguard character printing positions, to thereby print a safeguard character in such orders instead of the intended zero. Such printing of the safeguard symbol in lieu of an intended zero is prevented by the rocking action of the hammer latch 111 associated with the type carrier 81' leftwardly adjoining the type carrier corresponding to each of such orders, as the former type carried is actuated upwardly to its selectively indexed printing position, said rocking action of the hammer latch 111 being effective to position its offset extension 123 in blocking relationship with the angled face 189 of the slide 125 associated with the type carrier 81' corresponding to each of such orders. The upward activation of any type carrier 81' within the range of orders within which safeguard character printing is provided, or the upward activation of a type carrier 81 of still higher order, is also effective, through the influence of its counterclockwise rocking hammer latch on the hammer latches rightwardly disposed thereof, to prevent the printing of a safeguard character in lieu of an intended zero in each of said rightwardly disposed type carriers 81'. Such influence of the counterclockwise rocking of such highest order hammer latch is transmitted to each rightwardly disposed hammer latch by means of the leftwardly and forwardly extending projection 121 of each of said latches, the effect of such influence being the alternate rocking of each of the rightwardly disposed latches to thereby block each of the slides 125 associated with said rightwardly disposed type carriers, by means of the offset extensions 123 of the latches associated with the rightwardly disposed type carriers within such range.

*Gear train*

FIGURES 1 and 2 reflect the normal type-positioning gear train of an accounting machine such as that disclosed in U.S. Patent No. 2,629,549, such gear train being effective to raise a given type carrier 81 a distance corresponding to the forward travel of its corresponding actuator 59 and slide 69. In this conventional gear train, a plurality of large gears 76 cooperate with corresponding orders of a plurality of slides 69, and a plurality of large gears 77 cooperate with corresponding orders of a plurality of type carriers 81. Each of the actuator-related gears 76 is connected with a carrier-related gear 77 of corresponding order by means of a pair of pinions 78 and 79 fixed to a common shaft 107, the gear 76 being cooperably engaged with the pinion 78 and the gear 77 being cooperably engaged with the pinion 79. This gear and pinion arrangement provides a fixed and invariable relationship between the various type carriers 81 and their corresponding actuators 59. Accordingly, a given type carrier 81 which is indexed in its 0 printing position by the 0 stop shoulder 35 of its respectively stop sector 30 may not subsequently be moved downwardly from its 0 printing position to its safeguard character printing position.

The preferred embodiment of the present invention therefore provides an additional pair of large complementary and yieldably connected gears 91 and 93, an additional shaft assembly 105 comprising a pair of pinions 101 and 103, and an additional pair of pinions 97 and 99 disposed on the conventional shaft 107, for each printing order within the range of orders for which safeguard character printing is desired, as shown in FIGURE 6. The complementary gears 91 and 93 are freely rotatable on the shaft 90, and are so biased in opposite rotational directions by a spring 95 that their respective inwardly directed and complementary studs 92 and 94 are held in yieldable contact one with the other. The large gears 76 and 77 are freely rotatable on the shaft 90 and are cooperably engaged with the corresponding orders of the actuators 59 and the type carriers 81′, respectively. The pinions 97 and 78 are fixed to the shaft 107 and cooperably engaged with the large gears 91 and 76, respectively, whereas the pinions 99 and 79 are freely rotatable on the shaft 107 and cooperably engaged with the large gears 93 and 77, respectively. The pinions 101 and 103 fixed to the shaft 105 are cooperably engaged with the pinions 99 and 79, respectively.

When the lateral lug 37 of an actuator 59 which falls within the range of orders for which safeguard character printing is provided, is limited by the 0 stop shoulder of its stop sector 30, the corresponding large gear 76 is rotated one unit of travel in a counterclockwise direction on the shaft 90, the corresponding pinions 78 and 97 and the shaft 107 are rotated one unit of travel in a clockwise direction, and the corresponding large gear 91 is rotated one unit of travel in a counterclockwise direction. This one unit of counterclockwise rotation of the large gear 91 is effective to rotate the corresponding large gear 93 in a counterclockwise direction through the yieldable connection provided by the spring 95 and the complementary studs 92 and 94, such counterclockwise rocking of the large gear 93 being effective to rotate the pinion 99 one unit of clockwise travel about the shaft 107 and, through the pinion 99, to rotate the pinion 101, the shaft 105, and the pinion 103 a corresponding counterclockwise distance, the latter pinion 103 being effective to rotate the pinion 79 in a clockwise direction and the large gear 77 in a counterclockwise direction, to thereby raise the corresponding type carrier 81′ from its normal home position to its 0 printing position.

Later in the printing operation, as the type carrier 81′ is lowered from its 0 printing position to its safeguard character printing position, as previously described, the large gear 77 is rotated one unit of travel in a clockwise direction on the shaft 90, and the large gear 93 is also rotated one unit of clockwise travel, against the bias of the spring 95, by means of the pinions 79, 103, 101 and 99. This clockwise rotation of the large gear 93, at a time when the gear 91 is held stationary by limit of the lateral lug 37 against the 0 stop shoulder 35 of its corresponding stop sector 30, causes the complementary studs 92 and 94 of the gears 91 and 93 respectively, to separate. Upon completion of a printing operation in which a safeguard character has been printed by a type carrier 81′, as shown in FIGURE 6, the corresponding spring 95 causes the studs 92 and 94 to resume a contacting relationship as the gears 91 and 93 are restored to their normal or home positions.

*Control means*

With reference to FIGURE 2, the preferred embodiment of the invention also comprises control means for either activating or de-activating the safeguard character indexing mechanism, depending upon whether amounts are to be printed on negotiable or nonnegotiable records. A bail 171 is fixed to a shaft 173, the latter shaft being supported by suitable frame means within the accounting machine. A lever arm 175 is also fixed to the rightmost extremity of the shaft 173, and is pivotally connected by stud means to a link 177 the lower extremity of which is connected to the armature shaft of a solenoid 179. The bail 171 is normally biased in its counterclockwise rocked position by a spring 183 one end of which is connected to the bail 171 and the other end to a suitable machine frame member. When the bail 171 is positioned in its normal counterclockwise rocked position, slides 125 are retained in their forward inactivated positions relative to the activating studs 109 by means of the hooked tails 181. When the slides 125 are so positioned, the type carriers 81′ are rendered ineffective for printing a safeguard character. When the solenoid 179 is energized, however, through suitable means such as a keyboard control key, or lever, the link 177 is activated downwardly by the retraction of the solenoid's armature shaft, thereby rotating the lever arm 175, the shaft 173, and the bail 171 in a clockwise direction against the bias of the spring 183. This clockwise rocking of the bail 171 releases the hooked tails 181 of the slides 125 and permits the slides to be moved rearwardly by their respective springs 151, as the pivot member 145 is activated in a clockwise direction by the cam 163, the roller 161, the bellcrank 157, and the link 155.

*Operation of the mechanism*

To more fully explain the operation of one embodiment of the invention, the printing of a safeguard character in the column to the left of the most significant digit of a specified amount is explained in conjunction with an indexing mechanism that provides safeguard character printing in a predetermined number of orders. For this purpose, an indexing mechanism which provides safeguard characters in the fourth through ninth orders as shown in FIGURE 8 is assumed. The example number to be printed is $9,705.99 and the safeguard character is to be printed in the tens of thousands of dollars column, or in other words in order number 7 as shown in FIGURE 8.

A 9 is printed in both the units and tens of cents columns by conventional printing means, the type carriers 81 for these orders being raised to their 9 printing positions, and the corresponding hammer latches rocked in a counterclockwise direction by the camming action of the lower inclined surfaces 184 of these type carriers. The type carriers for the orders three through six are indexed upwardly, through conventional means, to their 5, 0, 7 and 9 printing positions, respectively. As the type carrier for the sixth order is activated upwardly to its 9 position, its leftwardly extending stud 108 is likewise activated upwardly above its blocking position relative to the slide 125 associated with the seventh order type carrier 81′. The seventh order slide 125 is accordingly permitted to be moved fully rearward so that its notch 187 is engaged with the activating stud 109 extending rightwardly from the seventh order type carrier, at such time as the cam 163 (FIGURE 2) activates the pivot member 145 in a clockwise direction. The seventh order type carrier 81′ (FIGURE 8) is lowered from its 0 printing position to its safeguard character printing position at such time as the cam 165 (FIGURE 2) contacts the roller 167 and rotates the yoke member 135 in a clockwise direction. The hammer 85 associated with the seventh order type carrier is released by the camming action of the upper inclined surface 185 of the downwardly moving seventh order type carrier against the hammer latch 111 corresponding thereto, to thereby effectuate the printing of the safeguard character in the seventh order (FIGURE 8). The hammer 85 associated with the fourth order type carrier is released by its corresponding hammer latch 111, so as to print the 0 in the fourth order, by contact of the counterclockwise rocking hammer latch 111 of the fifth order against the leftwardly and forwardly extending tail 121 of the fourth order hammer latch.

The safeguard character is prevented from printing in the eighth and ninth orders since the seventh and eighth order type carriers, respectively, have not been activated upwardly to selectively indexed positions, their respective blocking studs 108 being retained in blocking position relative to the slides 125 associated with the eighth and ninth order type carriers.

The safeguard character is prevented from printing in the fifth and sixth orders since the corresponding type carriers 81′ are activated upwardly to their 7 and 9 printing positions, respectively, prior to the time their associated slides 125 are activated rearwardly to seek engagement with the studs 109 extending rightwardly therefrom.

The safeguard character is also prevented from printing in the fourth order, in lieu of the desired 0, despite failure of the fourth order type carrier to rise above its 0 printing position and despite the upward activation of the stud 108 extending leftwardly from the third order type carrier as the latter carrier moves upwardly to its 5 printing position. Although released by the blocking stud 108 of the third order type carrier, the slide 125 associated with the fourth order carrier is nevertheless prevented from engaging the stud 109 extending rightwardly therefrom, inasmuch as the counterclockwise rocking of the hammer latch 111 associated with the highest order upward rising type carrier 81' effectively rocks the hammer latch associated with each lower order, by means of the leftwardly and forwardly extending projections 121 of each succeeding hammer latch 111 disposed to the right thereof. The offset extension 123 of the hammer latch associated with the sixth, fifth and fourth type carriers are accordingly rocked into blocking relationship with the angled faces 189 of their corresponding slides 125, to thereby prevent the printing of a safeguard character in any and all of such lower orders. As can be seen from this illustration, a safeguard character is printed only in the column to the left of the most significant digit of the amount printed.

While the invention has been described with respect to a preferred embodiment thereof, it will be understood that the invention and its various features are capable of changes and variations which are within the spirit and scope of the following claims.

We claim:

1. A mechanism for use in an accounting machine effective for cooperably printing a safeguard symbol in the column to the left of the most significant digit of a concurrently printed amount, said accounting machine having keyboard indexing means, actuating means, a plurality of type carriers representing predetermined orders, each type carrier comprising type characters ranging from 0 to 9, type positioning means responsive to said keyboard indexing means and to said actuating means to effectively position selected ones of said type characters representing selected orders in printing position, and printing means comprising a plurality of hammers and hammer latches, said printing means being responsive to said actuating means to effectively impact said selectively positioned type characters against a ribbon and a record medium, said mechanism comprising:

(a) a plurality of safeguard type characters disposed in a predetermined position in a predetermined number of orders of said type carriers, (b) means cooperating with said keyboard indexing means, with said actuating means and with said type carriers comprising said safeguard type characters, said means being effective to select the safeguard type character disposed in the carrier leftwardly adjoining the carrier representing the most significant digit of an amount to be printed, (c) means cooperating with said actuating means, with said type positioning means, and with said leftwardly adjoining type carrier, said means being effective to position said selected safeguard type character in printing position, and (d) means cooperating with the hammer latch associated with said leftwardly adjoining type carrier, said means being effective to release the hammer of corresponding order to the control of said printing means to thereby effectuate the printing of a safeguard symbol in the column to the left of said most significant digit.

2. An indexing mechanism adaptable to a printing device for automatically printing a safeguard symbol in the column to the left of the most significant digit of a concurrently printed amount, said printing device having printing means, a plurality of differentially positionable type carriers representing predetermined orders, a plurality of type characters of graduated numerical value disposed in each of said type carriers, and type carrier positioning means effective for positioning selected characters of said carriers in printing position, said indexing mechanism comprising:

(a) a plurality of safeguard type characters disposed in a predetermined position in a predetermined number of orders of said type carriers, (b) means cooperating with said differentially positioned type carriers effective to select the carrier leftwardly adjoining the carrier representing said most significant digit, (c) means cooperating with said type carrier positioning means and with said selected type carrier, said means being effective to position the safeguard type character of said selected carrier in printing position, and (d) means cooperating with said printing means effective for printing a safeguard symbol in the column to the left of said most significant digit by means of impacting said safeguard type character of said selected carrier against an inked ribbon and a record medium.

3. A safeguard character indexing mechanism for use in an accounting machine having actuating means, a first set of differentially positionable type carriers defining the parameters of a predetermined range of orders, each of said carriers comprising type characters ranging from 0 to 9, keyboard indexing means comprising a plurality of actuators, a plurality of first and second gears, and a plurality of pinions, said keyboard indexing means being effective for positioning said type carriers such that those characters corresponding to the value of an indexed amount are located in printing position, and printing means comprising a plurality of hammers and hammer latches, and a plurality of first inclined surfaces disposed on said type carriers, said safeguard character indexing mechanism comprising:

(a) a second set of differentially positionable type carriers of predetermined number disposed within said first set of type carriers, each of said second set of carriers comprising a safeguard type character disposed adjacent its 0 type character, (b) type carrier selecting means responsive to said actuating means and effective for locating and selecting the type carrier of said second set of carriers that leftwardly adjoins the highest order carrier of those which have been differentially positioned by said keyboard indexing means, (c) type carrier positioning means responsive to said actuating means and effective for activating said selected type carrier in such manner as to position its safeguard character in printing position, and (d) hammer release means cooperating with said selected type carrier as said carrier is activated to its safeguard character printing position, said means being effective to release the hammer corresponding thereto to the control of said printing means to thereby effectuate the printing of a safeguard symbol in the column to the left of the most significant digit of the amount printed.

4. The safeguard character indexing mechanism defined in claim 3 wherein said type carrier selecting means additionally comprises a plurality of bi-directionally movable slides, said slides corresponding in number to said predetermined number of said second set of differentially positionable type carriers, said bi-directional movement of said slides comprising a longitudinal movement and a separately occurring rotational movement.

5. The safeguard character indexing mechanism defined in claim 4 wherein said type carrier selecting means additionally comprises:

(a) first moving means cooperating with said actuating means and effective for moving said plurality of bi-directionally movable slides in a longitudinal direction, (b) first blocking means associated with said bi-directionally movable slides and with said second set of differentially positionable type carriers, and (c) second blocking means associated with said bi-directionally movable slides and with said hammer latches of said printing means.

6. The safeguard character indexing mechanism defined in claim 5 wherein said first moving means of said type carrier selecting means additionally comprises:

(a) a first cam and roller associated with said actuating means, (b) a pivot member comprising a limit plate, said member having a first and second position, (c) first spring means resiliently holding said pivot member in its first position, (d) second spring means biasing each of said bi-directionally movable slides into contacting relationship with said limit plate of said pivot member when said latter member is located in its first position, and (e) linkage means coupling said first roller to said pivot member, said first cam and roller responding to the activation of said actuating means to move said pivot member from its first to its second position against the bias of said first spring means, said movement of said pivot member being effective to move said movable slides in said longitudinal direction as motivated by said second spring means.

7. The safeguard character indexing mechanism defined in claim 5 wherein said first blocking means of said type carrier selecting means additionally comprises a plurality of first stud elements, said first stud elements corresponding in number to the predetermined number of said bi-directionally movable slides, one of said stud elements extending outwardly from one of the side surfaces of each of said second set of differentially positionable type carriers, said first stud elements being effective to arrest said longitudinal movement of their corresponding slides when the respective type carriers of said second set from the side surfaces of which they extend are located in their 0 printing positions.

8. The safeguard character indexing mechanism defined in claim 5 wherein said second blocking means of said type carrier selecting means additionally comprises:

(a) a plurality of hammer latches disposed within said hammer latches associated with said first set of type carriers defining the parameters of a predetermined range of orders, said plurality corresponding to the predetermined number of said bi-directionally movable slides, each of said hammer latches comprising an offset extension depending therefrom as well as a separate angularly disposed projection which renders each of said hammer latches rotationally activatable by the hammer-releasing rotation of its leftwardly adjoining hammer latch, and (b) a plurality of angled faces formed on said bi-directionally movable slides, each of said angled faces being limitably contactable by the depending offset extension of its associated hammer latch, when said hammer latch is rotationally activated in a hammer-releasing direction either by said first inclined surface of its associated differentially positioned type carrier or by the effect of the hammer-releasing rotation of its leftwardly adjoining hammer latch on its angularly disposed projection, said limitable contacting of the offset extension of a given hammer latch with the angled face of its associated movable slide being effective to arrest said longitudinal movement of said slide, said differential indexing of a type carrier of either said first or said second set being effective, through the camming action of its first inclined surface, to rotate its associated hammer latch in a hammer-releasing direction and to sequentially impart a similar hammer-releasing rotation to each hammer latch rightwardly disposed thereof through the angularly disposed projection of each of said hammer latches, said sequential rotation of said rightwardly disposed hammer latches being effective to limitably block and to arrest the longitudinal movement of each bi-directionally movable slide that is associated with said rightwardly disposed hammer latches.

9. The safeguard character indexing mechanism defined in claim 7 wherein said type carrier selecting means additionally comprises coupling means associated with said bi-directionally movable slides, with said first moving means, and with said second set of differentially positionable type carriers, said coupling means comprising:

(a) a plurality of notches formed in one extremity of said bi-directionally movable slides, one of said notches being formed in each of said slides in the extremity proximate said differentially positionable type carriers, and (b) a plurality of second stud elements, said second stud elements corresponding in number to the predetermined number of said movable slides, one of said stud elements being attached to each of said second set of differentially positionable type carriers on the side opposite said first stud element, said second stud element of each of said second set of type carriers being engageable by said notch of its associated movable slide, as motivated by said first moving means and as permitted by said first and said second blocking means.

10. The safeguard character indexing mechanism defined in claim 9 wherein said type carrier positioning means additionally comprises second moving means effective for imparting said separately occurring rotational movement to said bi-directionally movable slides, after said slides have been activated in a longitudinal direction by said first moving means, said second moving means comprising:

(a) a second cam and roller associated with said actuating means, (b) a yoke member supportively connected to said bi-directionally movable slides, to which member said second roller is rotatably attached, said yoke member having a first and a second position, and (c) third spring means resiliently holding said yoke member in its first position so as to oppose said separately occurring rotational movement of said bi-directionally movable slides, said second cam and roller responding to the activation of said actuating means to move said yoke member from its first to its second position against the bias of said third spring means, said movement of said yoke member being effective to impart said separately occuring rotational movement to said movable slides, said rotational movement of the slide associated with said differentially positionable type carrier selected by said type carrier selecting means being effective, in cooperation with said coupling means, to move said selected type carrier from its 0 printing position to its safeguard character printing position.

11. The safeguard character indexing mechanism defined in claim 9 wherein said type carrier positioning means additionally comprises enabling means effectively permitting said activation of said selected type carrier to its safeguard character printing position while otherwise limited in its 0 printing position by said first and second gears and said pinions of said keyboard indexing means, said enabling means comprising:

(a) a plurality of pairs of yieldably cooperable adjacent gears interposed with said first and said second gears of said keyboard indexing means, said plurality corresponding to said predetermined number of differentially positionable type carriers comprising said second set of carriers, each of said pairs of adjacent gears being associated with a predetermined one of said first gears cooperating with a corresponding type carrier comprising said second set, and with a predetermined one of said second gears cooperating with a corresponding one of said actuators, and (b) a plurality of sets of pinions interposed with said said pinions of said keyboard indexing means, said plurality corresponding to said predetermined number of differentially positionable type carriers comprising said second set of carriers, each of said sets of pinions comprising a predetermined number of pinions cooperating directly or indirectly with an associated pair of said yieldably cooperable gears and a predetermined number of pinions cooperating with said plurality of pinions of said keyboard indexing means, one of said latter pinions being cooperably associated with a predetermined one of said first gears cooperating with a type carrier and another of said latter pinions being cooperably associated with a predetermined one of said second gears cooperating with a corresponding actuator.

12. The safeguard character indexing mechanism defined in claim 11 wherein each of said pairs of yieldably cooperable adjacent gears comprising said enabling means additionally comprises:

(a) a pair of cooperating limit studs attached to the inner surfaces of said adjacent gears, each of said studs being disposed in contactable relationship with the other of said pair, and (b) fourth spring means disposed between the inner surfaces of said adjacent gears, said spring means being effective to bias said gears in an opposing rotational direction so as to hold said pair of limit studs in resilient contacting relationship, said yieldably cooperable relationship between said pair of adjacent gears being effective to enable the type carrier cooperating with its associated first gear of said keyboard indexing means to be activated to its safeguard character printing position despite the 0 positioning provided for said type carrier by the cooperation of its associated second gear of said keyboard indexing means with its associated actuator, said activation of said type carrier to its safeguard character printing position causing said limit studs of said pair of adjacent gears to separate against the bias of said fourth spring means.

13. The safeguard character indexing mechanism defined in claim 3 wherein said hammer release means additionally comprises a plurality of second inclined surfaces disposed adjacent said first inclined surfaces on said differentially positionable type carriers comprising said second set, said second inclined surface of said type carrier selected by said type carrier selecting means being effective, during said activation of said carrier to its safeguard character printing position, to release the hammer corresponding thereto to the control of said printing means and to thereby effectuate the printing of a safeguard symbol by means of the safeguard type character of said selected carrier, said printing of said safeguard symbol occurring in the column to the left of the most significant digit of the amount printed.

14. The safeguard character indexing mechanism defined in claim 9 and additionally comprising control means effective to activate and to de-activate the mechanism in accordance with the need as determined by the nature of the media being posted by said printing means, said control means comprising:

(a) third blocking means associated with said bi-directionally movable slides, (b) solenoid means cooperably associated with said third blocking means, said solenoid means being effective to de-activate said third blocking means when in its energized state, and to permit the activation of said third blocking means when in its de-energized state, said activation of said third blocking means being effective to prevent said longitudinal movement of said bi-directionally movable slides, and (c) switch means effective to energize and to de-energize said solenoid means.

15. The safeguard character indexing mechanism defined in claim 14 wherein said third blocking means additionally comprises:

(a) a plurality of hooked projections disposed on said bi-directionally movable slides on the extremity opposite said notches comprising said coupling means, (b) bail means cooperably associated with said solenoid means and with said plurality of hooked projections of said bi-directionally movable slides, said bail means having a first position effectively blocking said slides against said longitudinal movement and having also a second position permitting of said longitudinal movement, and (c) fifth spring means effectively biasing said bail means in its first position.

16. A safeguard character indexing mechanism for use in a printing device having actuating means, a first set of differentially positionable type carriers defining the parameters of a predetermined range of orders, each of said carriers comprising type characters ranging from 0 to 9, and printing means comprising a plurality of hammers, a plurality of first inclined surfaces disposed on said type carriers for releasably activating said hammers, and a first set of hammer latches cooperating with said type carriers and with said hammers, said first set of latches also defining said parameters of a predetermined range of orders, said safeguard character indexing mechanism comprising:

(a) a second set of differentially positionable type carriers representing a predetermined range of orders disposed within said first set of carriers, each of said second set of carriers comprising a safeguard type character disposed adjacent its 0 type character, a second inclined surface disposed adjacent its first inclined surface, and a first and a second stud element extending leftwardly and rightwardly therefrom, respectively, (b) a second set of hammer latches representing said predetermined range of orders disposed within said first set of hammer latches, each of said second set of latches comprising an offset extension depending therefrom as well as a separate angularly disposed projection which renders each of said hammer latches rotationally activatable by the hammer-releasing rotation of its leftwardly adjoining hammer latch, and (c) a predetermined number of bi-directionally movable slides associated with said second set of differentially positionable type carriers, each of said slides being terminally disposed between an adjacent pair of said type carriers and activatable therebetween by said actuating means in an initial longitudinal and a subsequently occurring rotational direction, each of said slides comprising a notch in its extremity proximate said differentially positionable type carriers, said notch being engageable, during said longitudinal movement of its respective slide, with said second stud element of the leftwardly adjoining type carrier, when said leftwardly adjoining carrier is located in its 0 printing position, said engagement being also preventable either by said first stud element of the rightwardly adjoining type carrier, when said rightwardly adjoining carrier is located in its 0 printing position, or preventable by the offset extension of its associated hammer latch, when said latch is rocked in a hammer-releasing direction either by the differential indexing of said leftwardly adjoining type carrier or by the hammer-releasing rotation of the next higher order hammer latch, said engagement of the notch of a given slide with said second stud element of its leftwardly adjoining type carrier during said initial longitudinal movement of said slide being effective to activate said type carrier from its 0 printing position to its safegaurd character printing position during said subsequently occurring rotational movement of said slide, to thereby effectuate the printing of a safeguard symbol by means of said leftwardly adjoining type carrier, in the column to the left of the most significant digit of the printed amount.

17. The safeguard character indexing mechanism defined in claim 16 wherein the blocking effect of the first stud element of the rightwardly adjoining type carrier, to thereby prevent the engagement of the notch of a given bi-directionally movable slide with the second stud element of the leftwardly adjoining type carrier, during said longitudinal movement of said slide, is effective to prevent the printing of a safeguard symbol in a plurality of columns to the left of said most significant digit within said predetermined range of orders.

18. The safeguard character indexing mechanism defined in claim 16 wherein the blocking effect of the offset extension of the hammer latch associated with the leftwardly adjoining type carrier, to thereby prevent the engagement of the notch of a given bi-directionally movable slide with the second stud element of said leftwardly adjoining type carrier, during said longitudinal movement of said slide, is effective to prevent the printing of a safeguard symbol, in lieu of an intended 0, in columns of lower order than the most significant digit within said predetermined range of orders.

References Cited

UNITED STATES PATENTS

| | | | |
|---|---|---|---|
| 2,016,684 | 10/1935 | Rabenda | 101—93 |
| 2,131,918 | 10/1938 | Mills | 101—93 |
| 2,629,549 | 2/1953 | Butler | 235—60.47 |
| 2,770,187 | 11/1956 | Swanson | 101—93 |

WILLIAM B. PENN, *Primary Examiner.*